(12) United States Patent  (10) Patent No.: US 8,378,803 B1
Keiser  (45) Date of Patent: Feb. 19, 2013

(54) SAFETY SYSTEM FOR ALL-TERRAIN VEHICLES

(76) Inventor: Craig A. Keiser, Ukiah, CA (US)

(*) Notice: Subject to any disclaimer, the term of this patent is extended or adjusted under 35 U.S.C. 154(b) by 549 days.

(21) Appl. No.: 12/626,469

(22) Filed: Nov. 25, 2009

(51) Int. Cl.
*B60Q 1/00* (2006.01)

(52) U.S. Cl. ............ 340/440; 340/425.5; 340/438; 340/459; 701/36; 701/38

(58) Field of Classification Search .......... 340/425.2, 340/438, 440, 459, 425.5; 701/36, 38
See application file for complete search history.

(56) References Cited

U.S. PATENT DOCUMENTS

| | | | |
|---|---|---|---|
| 5,532,672 A * | 7/1996 | Plazarin | 340/440 |
| 6,397,133 B1 * | 5/2002 | van der Pol et al. | 701/37 |
| 6,701,252 B2 | 3/2004 | Brown | |
| D508,213 S | 8/2005 | Silzer, Jr. et al. | |
| 6,941,206 B2 | 9/2005 | Hasegawa et al. | |
| 7,362,278 B2 | 4/2008 | Funayose | |
| 7,416,044 B2 | 8/2008 | Tsuruta | |
| 7,522,982 B2 | 4/2009 | Le et al. | |
| 2002/0156574 A1 * | 10/2002 | Fortin | 701/213 |
| 2002/0165064 A1 * | 11/2002 | Miki et al. | 477/45 |
| 2005/0217230 A1 * | 10/2005 | Bucher | 56/10.2 R |
| 2005/0270154 A1 * | 12/2005 | Nelson | 340/551 |
| 2006/0022812 A1 | 2/2006 | Lang | |
| 2006/0180372 A1 * | 8/2006 | Mercier et al. | 180/210 |
| 2007/0199108 A1 * | 8/2007 | Angle et al. | 901/17 |
| 2008/0120961 A1 * | 5/2008 | Meier et al. | 60/274 |
| 2008/0208416 A1 * | 8/2008 | Yuet et al. | 701/50 |
| 2008/0319606 A1 | 12/2008 | Fortson et al. | |
| 2009/0267335 A1 * | 10/2009 | Johnson et al. | 280/756 |
| 2010/0114435 A1 * | 5/2010 | Boylston et al. | 701/45 |

* cited by examiner

*Primary Examiner* — Jennifer Mehmood
*Assistant Examiner* — Andrew Bee

(57) ABSTRACT

A vehicle safety system comprising a microprocessor; a first sensor operatively connected to the microprocessor, the first sensor functions to detect a degree of deviation of yaw or pitch or roll of the vehicle relative to a control value of 0; wherein the microprocessor is configured to receive a first signal from the first sensor, the first signal being the degree of deviation; wherein when the first signal is between 31 and 45 degrees the microprocessor is configured to generate a first output command to a speaker to play a first alarm sound; wherein when the first signal is 46 degrees or more the microprocessor is configured to generate a second output command to the speaker to play a second alarm sound.

16 Claims, 3 Drawing Sheets

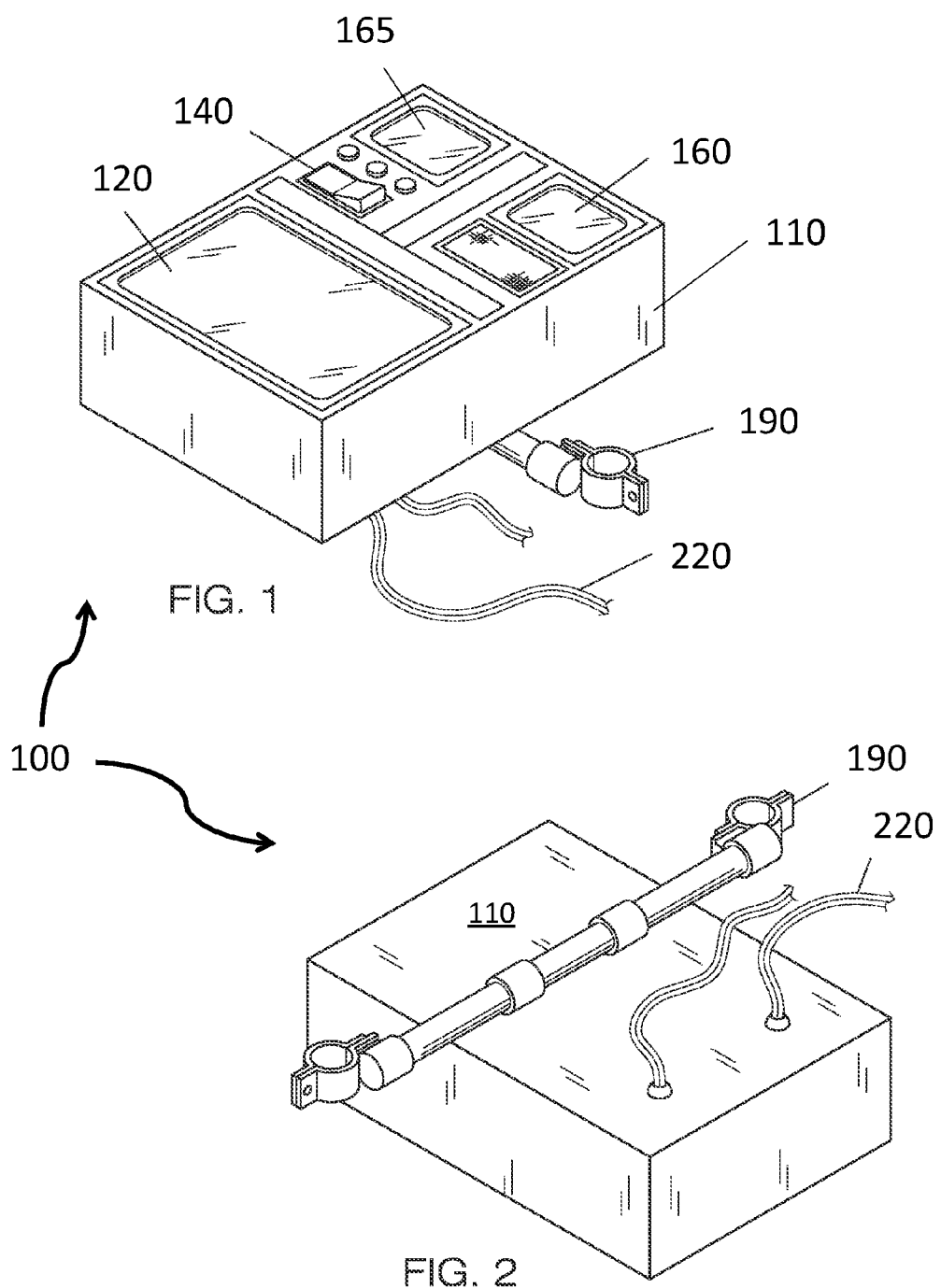

US 8,378,803 B1

SAFETY SYSTEM FOR ALL-TERRAIN VEHICLES

FIELD OF THE INVENTION

The present invention is directed to a vehicle accessory, more particularly to an electrical device for navigation purposes as well as for detecting dangerous driving conditions for all-terrain vehicles.

BACKGROUND OF THE INVENTION

All-terrain vehicles (ATVs) can be dangerous to operate, particularly if an individual is inexperienced. Many deaths and injuries occur every year due to ATV accidents. The present invention features a safety system for improving ATV safety. The safety system can help a rider determine his/her position and warn a rider if the ATV is in danger of tipping. In some embodiments, the safety system allows a rider to detect the presence of metal beneath the ATV. The safety system is not limited to use with an ATV, for example the safety system may be used with a golf cart.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a vehicle safety system comprising a microprocessor; a first sensor operatively connected to the microprocessor, the first sensor functions to detect a degree of deviation of yaw or pitch or roll of the vehicle relative to a control value of 0; wherein the microprocessor is configured to receive a first signal from the first sensor, the first signal being the degree of deviation; wherein when the first signal is between 31 and 45 degrees the microprocessor is configured to generate a first output command to a speaker 127 to play a first alarm sound; wherein when the first signal is 46 degrees or more the microprocessor is configured to generate a second output command to the speaker 127 to play a second alarm sound; and a housing mountable on the vehicle, the housing can house at least the microprocessor and the speaker 127, the housing further comprising a display for displaying the degree of deviation the first sensor detects.

In some embodiments, the vehicle is an all-terrain vehicle or a golf cart. In some embodiments, the first sensor is a vibrating structure gyroscope. In some embodiments, the first sensor is a micro-electro-mechanical system gyroscope. In some embodiments, the first sensor comprises an accelerometer. In some embodiments, the first alarm sound is a periodic tone. In some embodiments, the second alarm sound is a continuous tone. In some embodiments, the housing can be attached on the vehicle via a mounting component.

In some embodiments, the safety system further comprises a first light, a second light, a third light, and a fourth light, each light being operatively connected to the microprocessor. In some embodiments, when the first sensor detects a deviation of between 0 and 20 degrees, the microprocessor is configured to generate a first light output signal to the first light so as to illuminate the first light, wherein when the first sensor detects a deviation of between 21 and 30 degrees, the microprocessor is configured to generate a second light output command to the second light so as to illuminate the second light, wherein when the first sensor detects a deviation of between 31 and 45 degrees, the microprocessor is configured to generate a third light output command to the third light so as to illuminate the third light, wherein when the first sensor detects a deviation of 46 degrees or more, the microprocessor is configured to generate a fourth light output command to the fourth light so as to illuminate the fourth light.

In some embodiments, when the first sensor detects a deviation of between 0 and 10 degrees, the microprocessor is configured to generate a first light output signal to the first light so as to illuminate the first light, wherein when the first sensor detects a deviation of between 11 and 20 degrees, the microprocessor is configured to generate a second light output command to the second light so as to illuminate the second light, wherein when the first sensor detects a deviation of between 21 and 35 degrees, the microprocessor is configured to generate a third light output command to the third light so as to illuminate the third light, wherein when the first sensor detects a deviation of 36 degrees or more, the microprocessor is configured to generate a fourth light output command to the fourth light so as to illuminate the fourth light.

In some embodiments, the system further comprises a global positioning system (GPS). In some embodiments, the system further comprises a metal detector.

BRIEF DESCRIPTION OF THE DRAWINGS

FIG. 1 is a top perspective view of the safety system of the present invention.

FIG. 2 is a bottom perspective view of the safety system of FIG. 1.

DESCRIPTION OF PREFERRED EMBODIMENTS

Figure 3:
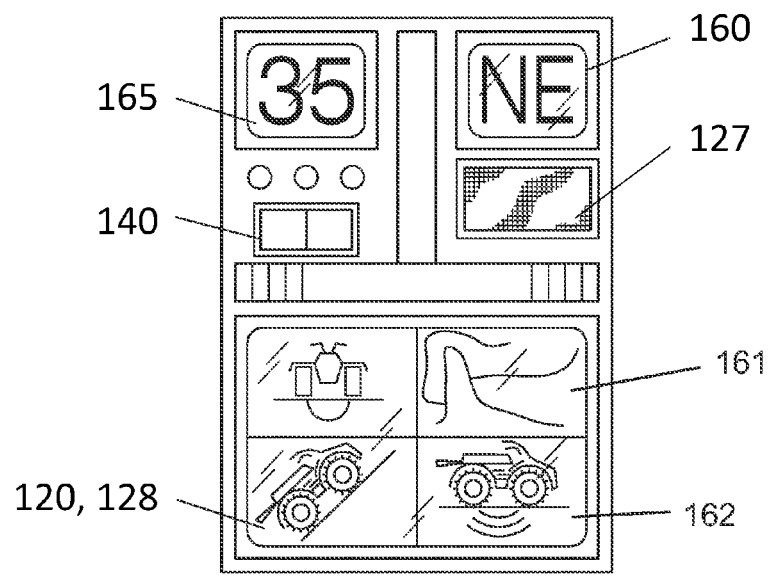
FIG. 3 is a top view of the safety system of FIG. 1.
Figure 4:
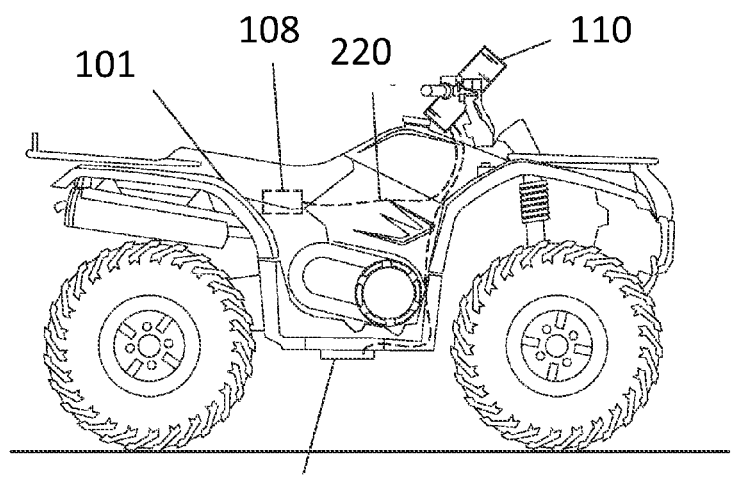
FIG. 4 is a side view of the safety system of the present invention as attached to an all-terrain vehicle (ATV).
Figure 5:
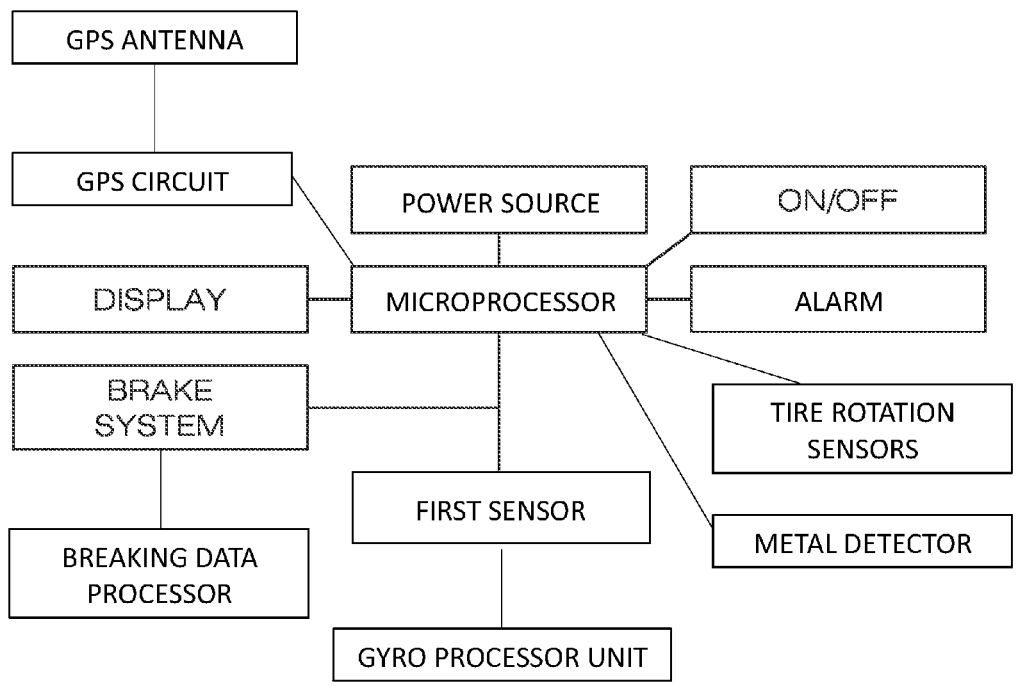
FIG. 5 is a schematic representation of the electrical components of the safety system of the present invention.

Referring now to FIGS. 1-5, the present invention features a safety system 100 for all-terrain vehicles (ATVs). The system 100 of the present invention can function as both a navigation system and a safety system. The system 100 of the present invention can help detect a potentially dangerous condition (e.g., rollover accident), for example the system 100 can warn a rider if he/she is in danger of tipping.

The safety system 100 comprises a first sensor for detecting yaw/pitch/roll of the ATV, the first sensor being operatively connected to a microprocessor. In some embodiments, the first sensor is a vibrating structure gyroscope. The gyroscope may use micro-electro-mechanical systems (MEMS) technology, however the gyroscope is not limited to MEMS technology. MEMS gyroscopes and the like are well known to one of ordinary skill in the art and are commonly used in automobiles or aircraft. In some embodiments, the first sensor further comprises an accelerometer. Accelerometers, which measure acceleration forces (e.g., tilt, acceleration), are well known to one of ordinary skill in the art. In some embodiments, accelerometers can determine the angle an object is tilted with respect to the Earth. In some embodiments, accelerometers can detect the way the object is moving. As an example, accelerometers are used in some vehicles to detect aspects of a vehicle crash so airbags are deployed at the appropriate time.

Tait-Bryan angles (e.g., pitch angle, roll angle, and yaw angle) are angles that describe the pitch, roll, and yaw of a vehicle relative to a control value of 0 degrees. Tait-Bryan angles are well known to one of ordinary skill in the art and are used to describe yaw, pitch, and roll of a vehicle such as an aircraft. The control value of 0 degrees (a standard value, well known to one of ordinary skill in the art) is when the vehicle is truly horizontal. The first sensor can detect a degree of deviation from the Tait-Bryan control value, the control value being 0 degrees of yaw, pitch, or roll. The first sensor relays the degree of deviation to the microprocessor.

The first sensor is configured to send a first signal to the microprocessor, the first signal being the degree of deviation from the control. The microprocessor is programmed to activate an alarm when the first sensor senses a high degree of deviation. For example, in some embodiments, when the first signal is greater than a certain value (e.g., 30 degrees or more, 35 degrees or more, 40 degrees or more, 45 degrees or more, etc.), the microprocessor is configured to generate a first output command to a speaker 127 to play a pre-recorded alarm sound.

In some embodiments, when the first signal is between 0 and 20 degrees, the microprocessor is configured to not generate an output command to the speaker 127. In some embodiments, when the first signal is between 21 and 30 degrees, the microprocessor is configured to not generate an output command to the speaker 127. In some embodiments, when the first signal is between 31 and 45 degrees, the microprocessor is configured to generate a first output command to the speaker 127 to play a first alarm sound (e.g., a periodic tone). In some embodiments, when the first signal is 46 degrees or more, the microprocessor is configured to generate a second output command to the speaker 127 to play a second alarm sound (e.g., a continuous tone).

As used herein, the term "alarm sound" refers to a sound and/or a pattern of a sound. For example, a first alarm sound may include both a specific sound and a frequency of repetition of that sound. In some embodiments, the alarm sound is a periodic tone. In some embodiments, the alarm sound is a continuous tone. In some embodiments, the alarm sound is an aircraft-type tone alert. The alarm sound is not limited to an aircraft-type tone alert.

The present invention is not limited to the aforementioned examples. For example, in some embodiments, when the first signal is between 0 and 20 degrees, the microprocessor is configured to not generate an output command to the speaker 127. In some embodiments, when the first signal is between 21 and 30 degrees, the microprocessor is configured to generate a first output command to the speaker 127 to play a first alarm sound. In some embodiments, when the first signal is between 31 and 40 degrees, the microprocessor is configured to generate a second output command to the speaker 127 to play a second alarm sound. In some embodiments, when the first signal is 41 degrees or more, the microprocessor is configured to generate a third output command to the speaker 127 to play a third alarm sound.

In some embodiments, when the first signal is between 0 and 25 degrees, the microprocessor is configured to not generate an output command to the speaker 127. In some embodiments, when the first signal is between 26 and 35 degrees, the microprocessor is configured to generate a first output command to the speaker 127 to play a first alarm sound. In some embodiments, when the first signal is 36 degrees or more, the microprocessor is configured to generate a second output command to the speaker 127 to play a second alarm sound.

The safety system 100 comprises a housing 110 for housing the components of system 100 (e.g., the first sensor, the microprocessor, the speaker 127, etc.). The microprocessor (and/or first sensor and/or speaker 127) is operatively connected to a power source. The power source may be housed in the housing 110.

The housing 110 can be mounted on the ATV 101, for example near the dash of the ATV. In some embodiments, the housing 110 can be attached on the ATV 101 via a mounting component 190. The mounting component 190 may include a hook mechanism, a hook-and-loop fastener mechanism, a tie mechanism, a clip mechanism, a clamp mechanism, an adhesive mechanism, the like, or a combination thereof. For example, the housing 110 may be attached (e.g., to a dashboard) via an adhesive (e.g., a double-sided tape). Alternatively, the housing 110 may be incorporated into the vehicle during manufacture.

A display panel 120 is disposed on the housing 110, for example on the top surface of the housing 110. In some embodiments, the system 100 comprises one or more lights (e.g., light emitting diodes (LEDs)) disposed on the housing 110. The lights may be of various colors. A control button 140 is disposed on the housing 110 for turning the system 100 on and off (e.g., via the power source). Display panels, lights (LEDs), and control buttons are well known to one of ordinary skill in the art. In some embodiments, the system 100 further comprises a compass 160 disposed on the housing 110, for example on the top surface of the housing 110.

In some embodiments, a degree display 165 is disposed on the housing 110 for indicating the degree of deviation the first sensor is detecting. In some embodiments, the microprocessor is configured to send a display output signal to the degree display 165 to cause the degree display 165 to show the degree of deviation the first sensor has detected.

In some embodiments, the system 100 of the present invention further comprises a means of displaying a road map and/or a trail map with a global positioning system 161 (GPS). In some embodiments, the system 100 further comprises a metal detector 850. Metal detectors and GPS devices are well known to one of ordinary skill in the art. The metal detector 850 can detect the presence of metal underneath the vehicle. A metal detector display component 162 may be part of the display 120. The display 120 may comprise a pitch/yaw display 128.

The microprocessor (and/or display and/or speaker 127 and/or first sensor, etc.) is operatively connected to a power source. In some embodiments, the power source is the electrical system 108 of the ATV 101 or a battery. In some embodiments, the microprocessor (and/or display and/or speaker 127 and/or first sensor, etc.) is operatively connected to the power source (e.g., electrical system, battery) via a wire 220.

In some embodiments, the system 100 (e.g., the first sensor, the microprocessor, the display, etc.) helps to indicate danger to the rider via a visual mechanism. For example, in some embodiments, the system 100 comprises a first light (e.g., a green light), and/or a second light (e.g., a yellow light), and/or a third light (e.g., an orange light), and/or a fourth light (e.g., a red light).

In some embodiments, the first light is illuminated if the first sensor detects a deviation of between 0 and 20 degrees. In some embodiments, the second light is illuminated if the sensor detects a deviation of between 21 and 30 degrees. In some embodiments, the third light is illuminated if the first sensor detects a deviation of between 31 and 45 degrees. In some embodiments, the fourth light is illuminated if the first sensor detects a deviation of 46 degrees or more.

The present invention is not limited to the aforementioned light examples. For example, in some embodiments, the first light is illuminated if the first sensor detects a deviation of between 0 and 10 degrees. In some embodiments, the second light is illuminated if the sensor detects a deviation of between 11 and 20 degrees. In some embodiments, the third light is illuminated if the first sensor detects a deviation of between 21 and 35 degrees. In some embodiments, the fourth light is illuminated if the first sensor detects a deviation of 36 degrees or more.

If the ATV is being operated in dangerous conditions (e.g., excessive yaw/roll/pitch), the first sensor/microprocessor cause the alarm (and/or lights) to be activated so as to alert the rider. The rider can heed the warning and correct the problem by driving more safely, driving slower, or driving on different terrain.

In some embodiments, the system 100 of the present invention is operatively connected to the brake system of the ATV. In some embodiments, when the system 100 detects excessive yaw and/or excessive pitch, the system 100 causes the brakes to be applied to help ensure the driver's safety.

The housing 110 may be constructed in a variety of sizes and shapes. In some embodiments, the housing 110 is between about 2 to 4 inches in length as measured from the top end to the bottom end. In some embodiments, the housing 110 is between about 4 to 6 inches in length as measured from the top end to the bottom end. In some embodiments, the housing 110 is more than about 6 inches in length.

In some embodiments, the housing 110 is between about 2 to 4 inches in height as measured from the top surface to the bottom surface. In some embodiments, the housing 110 is between about 4 to 6 inches in height as measured from the top surface to the bottom surface. In some embodiments, the housing 110 is more than about 6 inches in height.

In some embodiments, the housing 110 is between about 2 to 4 inches in width as measured from the first side to the second side. In some embodiments, the housing 110 is between about 4 to 6 inches in width as measured from the first side to the second side. In some embodiments, the housing 110 is more than about 6 inches in width.

As used herein, the term "about" refers to plus or minus 10% of the referenced number. For example, an embodiment wherein the housing 110 is about 4 inches in length includes a housing 110 that is between 3.6 and 4.4 inches in length.

The following the disclosures of the following U.S. Patents are incorporated in their entirety by reference herein: U.S. Pat. No. 6,941,206; U.S. Pat. Application No. 2008/0319606; U.S. Pat. No. 2006/0022812; U.S. Pat. No. 7,416,044; U.S. Pat. No. 7,362,278; U.S. Pat. No. 7,522,982; U.S. Pat. No. 6,701,252.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A vehicle safety system disposed on an all terrain vehicle (ATV), the system comprising:
   (a) a microprocessor;
   (b) a first sensor operatively connected to the microprocessor, the first sensor functions to detect a degree of deviation of yaw or pitch or roll of the vehicle relative to a control value of 0 degrees, the control value of 0 degrees is a standard Tait-Bryan angle;
   wherein the microprocessor is configured to receive a first signal from the first sensor, the first signal being the degree of deviation; wherein when the first signal is between 31 and 45 degrees the microprocessor is configured to generate a first output command to a speaker to play a first alarm sound; wherein when the first signal is 46 degrees or more the microprocessor is configured to generate a second output command to the speaker to play a second alarm sound;
   (c) a metal detector operatively connected to the microprocessor, wherein the metal detector detects the presence of metal underneath the vehicle;
   (d) a housing mountable on the vehicle, the housing can house at least the microprocessor and the speaker, the housing further comprising a compass, a pitch/yaw display, a metal detector display and a display for displaying the degree of deviation the first sensor detects; and
   wherein the housing is attached on the vehicle via a mounting component; and
   (e) a brake operatively coupled to the microprocessor, wherein the microprocessor detects a predetermined yaw and/or pitch, at which point the microprocessor causes the brake to be applied to slow down the ATV.

2. The vehicle safety system of claim 1, wherein the vehicle is an all-terrain vehicle or a golf cart.

3. The vehicle safety system of claim 1, wherein the first sensor is a vibrating structure gyroscope.

4. The vehicle safety system of claim 3, wherein the first sensor is a micro-electro-mechanical system gyroscope.

5. The vehicle safety system of claim 3, wherein the first sensor comprises an accelerometer.

6. The vehicle safety system of claim 1, wherein the first alarm sound is a periodic tone.

7. The vehicle safety system of claim 1, wherein the second alarm sound is a continuous tone.

8. The vehicle safety system of claim 1 further comprising a first light, a second light, a third light, and a fourth light, each light being operatively connected to the microprocessor.

9. The vehicle safety system of claim 8, wherein when the first sensor detects a deviation of between 0 and 20 degrees, the microprocessor is configured to generate a first light output signal to the first light so as to illuminate the first light, wherein when the first sensor detects a deviation of between 21 and 30 degrees, the microprocessor is configured to generate a second light output command to the second light so as to illuminate the second light, wherein when the first sensor detects a deviation of between 31 and 45 degrees, the microprocessor is configured to generate a third light output command to the third light so as to illuminate the third light, wherein when the first sensor detects a deviation of 46 degrees or more, the microprocessor is configured to generate a fourth light output command to the fourth light so as to illuminate the fourth light.

10. The vehicle safety system of claim 8, wherein when the first sensor detects a deviation of between 0 and 10 degrees, the microprocessor is configured to generate a first light output signal to the first light so as to illuminate the first light, wherein when the first sensor detects a deviation of between 11 and 20 degrees, the microprocessor is configured to generate a second light output command to the second light so as to illuminate the second light, wherein when the first sensor detects a deviation of between 21 and 35 degrees, the microprocessor is configured to generate a third light output command to the third light so as to illuminate the third light, wherein when the first sensor detects a deviation of 36 degrees or more, the microprocessor is configured to generate a fourth light output command to the fourth light so as to illuminate the fourth light.

11. The system of claim 1 further comprising a global positioning system (GPS).

12. A vehicle safety system disposed on an all terrain vehicle (ATV), the system comprising:
   (a) a microprocessor;
   (b) a first sensor operatively connected to the microprocessor, the first sensor functions to detect a degree of deviation of yaw or pitch or roll of the vehicle relative to a control value of 0;
   wherein the microprocessor is configured to receive a first signal from the first sensor, the first signal being the degree of deviation; wherein when the first signal is between 26 and 35 degrees the microprocessor is configured to generate a first output command to a speaker to play a first alarm sound; wherein when the first signal is 36 degrees or more the microprocessor is configured to generate a second output command to the speaker to play a second alarm sound;
   (c) a metal detector operatively connected to the microprocessor, wherein the metal detector detects presence of metal underneath the vehicle;
   (d) a housing mountable on the vehicle, the housing can house at least the microprocessor and the speaker, the housing further comprising a compass, a pitch/yaw display, a metal detector display and a display for displaying the degree of deviation the first sensor detects; and
   (e) a brake operatively coupled to the microprocessor, wherein the microprocessor detects a predetermined yaw and/or pitch, at which point the microprocessor causes the brake to be applied to slow down the ATV.

13. The vehicle safety system of claim 12 further comprising a first light, a second light, a third light, and a fourth light, each light being operatively connected to the microprocessor.

14. The vehicle safety system of claim 13, wherein when the first sensor detects a deviation of between 0 and 20 degrees, the microprocessor is configured to generate a first light output signal to the first light so as to illuminate the first light, wherein when the first sensor detects a deviation of between 21 and 30 degrees, the microprocessor is configured to generate a second light output command to the second light so as to illuminate the second light, wherein when the first sensor detects a deviation of between 31 and 45 degrees, the microprocessor is configured to generate a third light output command to the third light so as to illuminate the third light, wherein when the first sensor detects a deviation of 46 degrees or more, the microprocessor is configured to generate a fourth light output command to the fourth light so as to illuminate the fourth light.

15. The vehicle safety system of claim 13, wherein when the first sensor detects a deviation of between 0 and 10 degrees, the microprocessor is configured to generate a first light output signal to the first light so as to illuminate the first light, wherein when the first sensor detects a deviation of between 11 and 20 degrees, the microprocessor is configured to generate a second light output command to the second light so as to illuminate the second light, wherein when the first sensor detects a deviation of between 21 and 35 degrees, the microprocessor is configured to generate a third light output command to the third light so as to illuminate the third light, wherein when the first sensor detects a deviation of 36 degrees or more, the microprocessor is configured to generate a fourth light output command to the fourth light so as to illuminate the fourth light.

16. A vehicle safety system disposed on an all terrain vehicle (ATV), the system comprising:
   (a) a microprocessor;
   (b) a first sensor operatively connected to the microprocessor, the first sensor functions to detect a degree of deviation of yaw or pitch or roll of the vehicle relative to a control value of 0;
   wherein the microprocessor is configured to receive a first signal from the first sensor, the first signal being the degree of deviation; wherein when the first signal is between 21 and 30 degrees the microprocessor is configured to generate a first output command to a speaker to play a first alarm sound; wherein when the first signal is between 31 and 40 the microprocessor is configured to generate a second output command to the speaker to play a second alarm sound, wherein when the first signal is 41 degrees or more the microprocessor is configured to generate a third output command to the speaker to play a third alarm sound;
   (c) a metal detector operatively connected to the microprocessor, wherein the metal detector detects the presence of metal underneath the vehicle;
   (d) a housing mountable on the vehicle, the housing can house at least the microprocessor and the speaker, the housing further comprising a compass, a pitch/yaw display, a metal detector display and a display for displaying the degree of deviation the first sensor detects; and
   (e) a brake operatively coupled to the microprocessor, wherein the microprocessor detects a predetermined yaw and/or pitch, at which point the microprocessor causes the brake to be applied to slow down the ATV.

* * * * *